US009284900B2

(12) United States Patent
Yanoto (10) Patent No.: US 9,284,900 B2
(45) Date of Patent: Mar. 15, 2016

(54) FUEL INJECTION CONTROL DEVICE FOR INTERNAL COMBUSTION ENGINE

(71) Applicant: DENSO CORPORATION, Kariya, Aichi-pref. (JP)

(72) Inventor: Keisuke Yanoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 236 days.

(21) Appl. No.: 14/222,933

(22) Filed: Mar. 24, 2014

(65) Prior Publication Data
US 2014/0299103 A1 Oct. 9, 2014

(30) Foreign Application Priority Data
Apr. 9, 2013 (JP) ................................. 2013-81213

(51) Int. Cl.
| F02M 37/08 | (2006.01) |
| F02D 41/00 | (2006.01) |
| F02D 41/06 | (2006.01) |
| F02D 41/14 | (2006.01) |
| F02D 41/38 | (2006.01) |
| F02D 19/08 | (2006.01) |

(52) U.S. Cl.
CPC .......... *F02D 41/0025* (2013.01); *F02D 19/084* (2013.01); *F02D 41/064* (2013.01); *F02D 41/1401* (2013.01); *F02D 41/3845* (2013.01); *F02D 2041/141* (2013.01); *F02D 2200/021* (2013.01); *F02D 2200/0602* (2013.01); *F02D 2200/0611* (2013.01); *F02D 2200/0614* (2013.01); *F02D 2250/31* (2013.01)

(58) Field of Classification Search
CPC .............. F02D 41/0025; F02D 41/064; F02D 41/1401; F02D 41/3845; F02D 19/084; F02D 2200/0614; F02D 2200/0602; F02D 2200/0611; F02D 2200/021; F02D 2250/31; F02D 2041/141; F02M 37/08
USPC ......... 123/435, 447, 456, 457, 491, 497, 510, 123/511; 701/103–105, 113
See application file for complete search history.

(56) References Cited

U.S. PATENT DOCUMENTS

| 7,066,149 B1 * | 6/2006 | Date ..................... F02D 33/006 123/447 |
| 7,284,539 B1 * | 10/2007 | Fukasawa ............... F02D 41/08 123/456 |
| 8,844,503 B2 * | 9/2014 | Worthington .......... F02M 37/22 123/446 |

FOREIGN PATENT DOCUMENTS

| JP | 2003-328816 | 11/2003 |
| JP | 2010-37968 | 2/2010 |

* cited by examiner

*Primary Examiner* — Hai Huynh
(74) *Attorney, Agent, or Firm* — Nixon & Vanderhye PC (57) ABSTRACT

A fuel injection control device includes a fuel injection control unit and a pump control unit. The fuel injection control unit controls a fuel injection amount of a fuel injection valve. The pump control unit calculates a pump control amount based on feedforward and feedback terms and controls a fuel pump based on the pump control amount. The fuel injection control unit includes a first injection control unit for performing fuel injection by the valve at a starting injection amount in a starting period after commencement of starting of an engine by its starting unit until a predetermined rotation increase of the engine is produced in association with fuel combustion. The pump control unit includes a starting control unit for calculating the feedforward term based on the starting injection amount in the starting period and for calculating the pump control amount using this feedforward term.

7 Claims, 7 Drawing Sheets

ADDITIONAL PERIOD Tadd

FUEL INJECTION CONTROL DEVICE FOR INTERNAL COMBUSTION ENGINE

CROSS REFERENCE TO RELATED APPLICATION

This application is based on Japanese Patent Applications No. 2013-81213 filed on Apr. 9, 2013, the disclosure of which is incorporated herein by reference.

TECHNICAL FIELD

The present disclosure relates to a fuel injection control device for an internal combustion engine.

BACKGROUND

Conventionally, a cylinder injection-type internal combustion engine has been put into practical use as an internal combustion engine for an automobile, and use of alcohol-containing fuel including alcohol such as ethanol is considered as fuel for this internal combustion engine. In this case, in the cylinder injection-type internal combustion engine, fuel which has been highly pressurized by a high-pressure pump is stored in a delivery pipe serving as a pressure accumulation pipe, and the high-pressure fuel in this delivery pipe is injected directly into a combustion chamber through a fuel injection valve. As fuel pressure control for the high-pressure pump, there is known a technique for setting a target fuel pressure based on an engine operating state, and for performing fuel pressure feedback control such that actual fuel pressure reaches the target fuel pressure.

In the case of the use of alcohol-containing fuel, alcohol-containing fuel is not easily evaporated compared with gasoline, so that there is concern about reduction in low-temperature starting of the engine. Particularly, a range below the freezing point is physically equal to or lower than the flash point of ethanol, and the engine may not be easily started up. In this regard, there is proposed a technique including a means for setting a starting target fuel pressure based on alcohol concentration of fuel and engine temperature, and a means for prohibiting the fuel injection through the fuel injection valve until a difference between the starting target fuel pressure and an actual fuel pressure becomes a predetermined value or smaller at the time of starting of the internal combustion engine (see, e.g., JP-A-2010-37968). Moreover, in this case, it is proposed that the starting target fuel pressure should be made higher as the alcohol concentration is higher or as the engine temperature is lower.

According to the above-described configuration, the fuel injection is started after increasing the fuel pressure to the starting target fuel pressure at the time of starting of the engine. Furthermore, even though vaporization characteristics of fuel are different according to the alcohol concentration and engine temperature, the starting target fuel pressure suitable for the these alcohol concentration and engine temperature are set to promote the vaporization of injected fuel, thereby improving the low-temperature starting of the engine even in the case of the use of alcohol-containing fuel.

As for fuel pressure control in the case of use of gasoline fuel, generally, after commencement of the starting of the internal combustion engine by a starter, the high-pressure pump is driven with a predetermined discharge amount until a engine rotation speed reaches a predetermined starting determination value (i.e., before completion of starting), and the fuel pressure feedback control is started after the engine rotation speed has reached the starting determination value (i.e., after completion of starting) as a result of first explosion.

During the fuel pressure feedback control by the high-pressure pump, generally, a feedforward term and feedback term are respectively calculated, and a control command value for the high-pressure pump is calculated based on these feedforward term and feedback term. More specifically, the feedforward term is calculated based on a fuel injection amount of the fuel injection valve, and the feedback term is calculated based on a deviation between the target fuel pressure and actual fuel pressure and a predetermined feedback gain. In this case, on the assumption that the fuel pressure feedback control is started after the completion of starting, the feedforward term is calculated based on the fuel injection amount after the completion of starting.

In the case of the use of alcohol-containing fuel, the injection amount is larger than gasoline fuel despite the same required torque of the internal combustion engine, and the fuel pressure is changed greatly due to a periodic start of fuel injection after commencement of the starting of the engine. In addition, if the alcohol concentration of fuel varies, the fuel injection amount differs accordingly, so that the fuel pressure is also changed. For this reason, the fuel pressure feedback control may be started at an early stage so as to limit such a change of fuel pressure.

However, the existing technique assumes a start of the fuel pressure feedback control after the completion of starting the engine, to cause such a defect that the change of fuel pressure at the very beginning of commencement of the starting cannot be limited. Thus, there is concern about inconvenience caused to the starting up of the internal combustion engine.

SUMMARY

The present disclosure addresses at least one of the above issues.

According to the present disclosure, there is provided a fuel injection control device applied to a fuel injection system for an internal combustion engine.

The fuel injection system includes a pressure accumulation chamber, a fuel injection valve, a fuel pump, and a fuel pressure detecting means. The pressure accumulation chamber is capable of accumulating pressure of fuel in a high-pressure state. The fuel injection valve injects fuel, which is supplied by the pressure accumulation chamber, directly into a combustion chamber of the engine. The fuel pump highly pressurizes fuel, which is supplied from a low-pressure side of the system, and supplies the highly-pressurized fuel to the pressure accumulation chamber. The fuel pressure detecting means is for detecting fuel pressure in the pressure accumulation chamber. Alcohol-containing fuel including alcohol is employable for fuel in the engine. The fuel injection control device includes a fuel injection control means and a pump control means. The fuel injection control means is for controlling a fuel injection amount of the fuel injection valve. The pump control means is for calculating a pump control amount based on a feedforward term and a feedback term and is for controlling the fuel pump based on the pump control amount. The feedforward term is calculated based on the fuel injection amount of the fuel injection valve. The feedback term is calculated based on a difference between a target fuel pressure and an actual fuel pressure, which is detected by the fuel pressure detecting means. The fuel injection control means includes a first injection control means for performing the injection of fuel by the fuel injection valve at a starting injection amount in a starting period after commencement of starting of the engine by its starting means until a predetermined rotation increase of the engine is produced in association with fuel combustion. The starting injection amount is set based on an alcohol concentration of fuel and a temperature of the engine. The pump control means includes a starting control means for calculating the feedforward term based on the starting injection amount in the starting period and for calculating the pump control amount by use of the feedforward term calculated by the starting control means.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

A first embodiment for embodying the present disclosure will be described below in reference to the accompanying drawings. In the present embodiment, a cylinder injection-type multi-cylindered four-cycle gasoline engine (internal combustion engine) disposed in a vehicle is a controlled object, and various kinds of actuators in the engine are electronically controlled. The vehicle is a flex fuel vehicle (FFV), and alcohol-containing fuel in which alcohol such as ethanol is mixed into gasoline can be used for its in-vehicle engine. First, a general configuration of the entire engine control system will be described with reference to FIG. 1.

Figure 1:
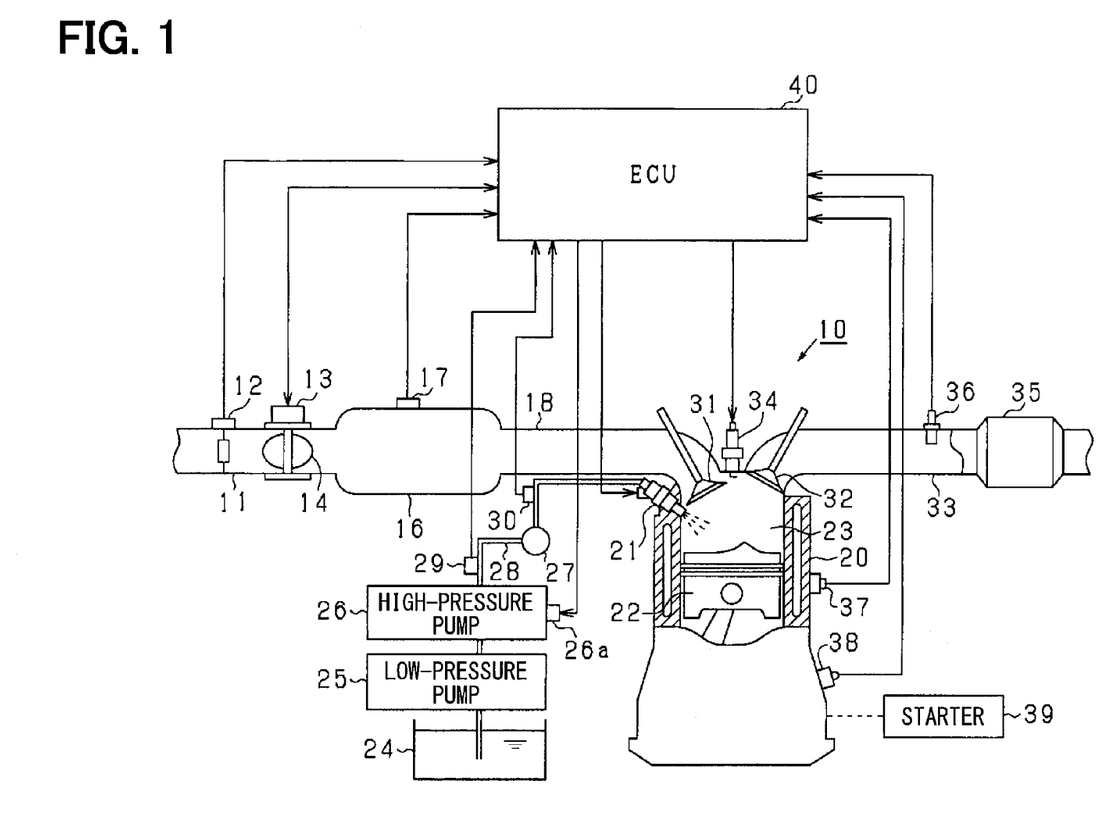
FIG. 1 is a diagram illustrating a general configuration of an engine control system in accordance with a first embodiment.

In a cylinder injection-type engine (hereinafter referred to as an engine 10) in FIG. 1, an airflow meter 12 for detecting an intake air amount is disposed at an upstream part of an intake pipe 11. A throttle valve 14 whose opening degree is adjusted by a throttle actuators 13 such as a DC motor is disposed on a downstream side of the airflow meter 12. The opening degree of this throttle valve 14 (throttle opening degree) is detected by a throttle opening degree sensor that is incorporated in the throttle actuators 13. A surge tank 16 is disposed on a downstream side of the throttle valve 14, and an intake pipe pressure sensor 17 for detecting intake pipe pressure is provided for this surge tank 16. An intake manifold 18 for introducing air into each cylinder of the engine 10 is connected to the surge tank 16.

An electromagnetically-driven injector 21 is provided for a cylinder block 20, and fuel is injected through the injector 21 directly into a combustion chamber 23 that is defined by a cylinder inner wall and an upper surface (top part) of a piston 22. The injector 21 may correspond to a fuel injection valve for cylinder injection. High-pressure fuel is supplied to the injector 21 by a high-pressure fuel system including a high-pressure pump.

The high-pressure fuel system will be briefly described. This system includes, as its main constituent elements, a low-pressure pump 25 for pumping up fuel in a fuel tank 24, a high-pressure pump 26 for highly pressurizing the low-pressure fuel pumped up by this low-pressure pump 25, and a delivery pipe 27 configured as a pressure accumulation chamber for storing the high-pressure fuel discharged from the high-pressure pump 26. The injectors 21 for the cylinders are connected respectively to the delivery pipe 27. Either one of gasoline, and alcohol-containing fuel in which alcohol such as ethanol is mixed into gasoline is stored in the fuel tank 24. The high-pressure fuel, which has been highly pressurized by the high-pressure pump 26 and stored in the delivery pipe 27, is injected through the injector 21 into the combustion chamber 23 (into the cylinder). A fuel pressure sensor 29 serving as a fuel pressure detecting means for detecting a pressure of fuel (fuel pressure) is provided for a high-pressure fuel pipe 28 connecting together the high-pressure pump 26 and the delivery pipe 27, or for the delivery pipe 27.

The high-pressure pump 26 is a mechanical pump and is driven by rotation of a cam shaft of the engine 10. A fuel discharged amount from the high-pressure pump 26 is controlled by an opening degree of a fuel pressure control valve 26a which is provided for the pump 26, and the fuel pressure in the delivery pipe 27 is highly pressurized to a maximum of approximately 20 MPa, for example. The fuel pressure control valve 26a includes a suction regulating valve for regulating the amount of fuel drawn into a fuel pressurizing chamber of the high-pressure pump 26, or a discharge regulating valve for regulating the amount of fuel discharged from the fuel pressurizing chamber. The fuel pressure in the delivery pipe 27 is variably controlled through adjustment of the opening degree of the fuel pressure control valve 26a In addition, the low-pressure pump 25 is an electrically-operated pump.

A concentration sensor 30 for detecting alcohol concentration in fuel is provided for the high-pressure fuel pipe 28. Instead of its placement position at the high-pressure fuel pipe 28, the concentration sensor 30 may be disposed at, for example, the fuel tank 24, or may be provided near the injector 21.

An intake valve 31 and an exhaust valve 32 are provided respectively for an intake port and exhaust port of the engine 10. Intake air is introduced into the combustion chamber 23 as a result of opening operation of the intake valve 31, and exhaust gas after combustion is discharged into an exhaust pipe 33 as a result of opening operation of the exhaust valve 32. An ignition plug 34 is attached to each cylinder at a cylinder head of the engine 10, and high voltage is applied to the ignition plug 34 through, for example, an ignition coil (not shown) with intended ignition timing. Through this application of high voltage, a spark discharge is generated between counter electrodes of each ignition plug 34 to light off the fuel in the combustion chamber 23 for combustion.

A projecting part (or cavity) which projects toward the cylinder head is formed at a top part of the piston 22, and the fuel (fuel spray) injected through the injector 21 can be guided to a discharge electrode part of the ignition plug 34 or to its vicinity owing to this projecting part.

A catalyst 35 for purifying exhaust gas is provided for the exhaust pipe 33. The catalyst 35 is, for example, a three-way catalyst for purifying carbon monoxide (CO), hydrocarbon (HC), nitrogen oxide (NOx) in exhaust gas. An air-fuel ratio sensor 36 which detects an air-fuel ratio of air-fuel mixture with the exhaust gas being its detection object is provided on an upstream side of the three-way catalyst 35 at the exhaust pipe 33.

In addition, a water temperature sensor 37 for detecting engine water temperature (corresponding to engine temperature), and a crank angle sensor 38 which outputs a crank angle signal having a rectangular shape for each predetermined crank angle of the engine (e.g., with a period of 10 degrees CA) are attached to the cylinder block 20. A starter 39 serving as a starting means for giving an initial rotation to a crankshaft (output shaft) at the time of engine start is provided for the engine 10.

The outputs from the above-described various kinds of sensors are inputted into an electronic control unit (hereinafter referred to as an ECU 40) for performing engine control. The ECU (fuel injection control means, pump control means, starting control means, determining means, target fuel pressure changing means, injection start permitting means) 40 includes a microcomputer having a central processing unit (CPU), a read only memory (ROM), and a random access memory (RAM), and by carrying out various kinds of control programs stored in the ROM, the ECU 40 controls the fuel injection amount of the injector 21 and controls, for example, the ignition timing of the ignition plug 34 according to an engine operating condition.

As for ignition timing control, specifically, the ECU 40 determines the ignition timing based on the engine water temperature, and makes the ignition plug 34 produce an ignition spark with its ignition timing through drive of an igniter (not shown). For example, the ECU 40 advances the ignition timing further as the engine water temperature is lower. In addition, using an engine load (e.g., intake air amount) and an engine rotation speed as parameters, the ignition timing may be determined based on these parameters.

As for basic control of the fuel injection, specifically, using an engine load (e.g., intake air amount) and an engine rotation speed as parameters, the ECU 40 calculates a basic injection amount based on these parameters. The ECU 40 also calculates the final fuel injection amount by appropriately making, for example, a water temperature correction or air-fuel ratio correction to this basic injection amount. In the case of use of alcohol-containing fuel, the fuel injection is calculated in view of the alcohol concentration of fuel, and the fuel injection amount is properly corrected based on the alcohol concentration detected by the concentration sensor 30.

A method for the calculation of the fuel injection amount is different between at the very beginning of commencement of the starting of the engine 10 by the starter 39 and after completion of the starting. Specifically, a starting injection amount Q1 is calculated based on the alcohol concentration of fuel and the engine water temperature after the commencement of the starting of the engine 10 until the engine rotation speed reaches a predetermined starting determination value N1 (e.g., 400 rpm) (i.e., before completion of starting). The drive of the injector 21 is controlled (corresponding to a first injection control means) using the starting injection amount Q1. After the commencement of the starting of the engine 10, the basic injection amount is calculated based on the engine load and the engine rotation speed as described above after the first explosion has been created in the engine 10 and the engine rotation speed reached the predetermined starting determination value N1 (i.e., after completion of starting). Moreover, the final fuel injection amount is calculated through, for example, an appropriate water temperature correction, air-fuel ratio correction, or alcohol concentration correction to the basic injection amount, and the drive of the injector 21 is controlled (corresponding to a second injection control means) by the fuel injection amount (after-start injection amount Q2)

The ECU 40 carries out fuel pressure control to maintain the fuel pressure in the delivery pipe 27, i.e., injection pressure at an intended pressure. Specifically, ECU 40 sets a target fuel pressure based on the engine operating condition of each time, and performs fuel pressure feedback control based on a difference between this target fuel pressure and an actual fuel pressure detected by the fuel pressure sensor 29. As for the fuel pressure feedback control, more specifically, in this control, a feedforward term and a feedback term are respectively calculated, and for example, a pump control amount constituted of a control duty ratio is calculated from these feedforward term and feedback term. The fuel pressure control valve 26a of the high-pressure pump 26 is driven using the pump control amount, so that the fuel pressure (injection pressure) in the delivery pipe 27 is controlled to the target value.

The feedforward term is an open control term that is calculated with the fuel injection amount of the injector 21 as a parameter. Specifically, every time fuel is injected through the injector 21, the fuel pressure in the delivery pipe 27 is reduced according to this injected amount. Accordingly, the feedforward term is calculated based on the fuel injection amount of the injector 21 to make up for a pressure decrease due to the fuel injection. The feedback term is calculated from a difference between the target fuel pressure and the actual fuel pressure, and a predetermined feedback gain.

A method for the fuel pressure control also differs between at the very beginning of commencement of the starting of the engine 10 and after completion of the starting, and this difference will be described below. At the very beginning of commencement of the starting of the engine 10, upon start of the rotation of the crankshaft (cam shaft) of the engine 10, the fuel injection of the high-pressure pump 26 is started, and fuel is discharged first in a predetermined discharge amount (fixed amount discharge). For example, the high-pressure pump 26 is driven with the maximum discharge amount. Then, when the fuel pressure increases to reach a predetermined injection permitted fuel pressure P1, the fuel pressure feedback control is started thereafter.

In such a case, before the engine rotation speed increases to the starting determination value N1 (before completion of starting of the engine 10), the fuel pressure feedback control is carried out with the injection permitted fuel pressure P1 set at the target fuel pressure. Additionally, the feedforward term is calculated based on the starting injection amount Q1. After the engine rotation speed has increased to the starting determination value N1 (after completion of starting), the fuel pressure feedback control is carried out using the target fuel pressure (after-start target fuel pressure P2) calculated based on the engine operating conditions such as the engine rotation speed and the engine load. Additionally, the feedforward term is calculated based on the after-start injection amount Q2.

After the commencement of the starting of the engine 10, the fuel injection of the injector 21 is prohibited before the fuel pressure reaches the injection permitted fuel pressure P1, and the fuel injection is permitted when the fuel pressure reaches the injection permitted fuel pressure P1. As described above, through this control of the pressure-rising start, an early increase of the fuel pressure is promoted to improve startability of the engine 10 at the time of its cold starting.

Figure 2:
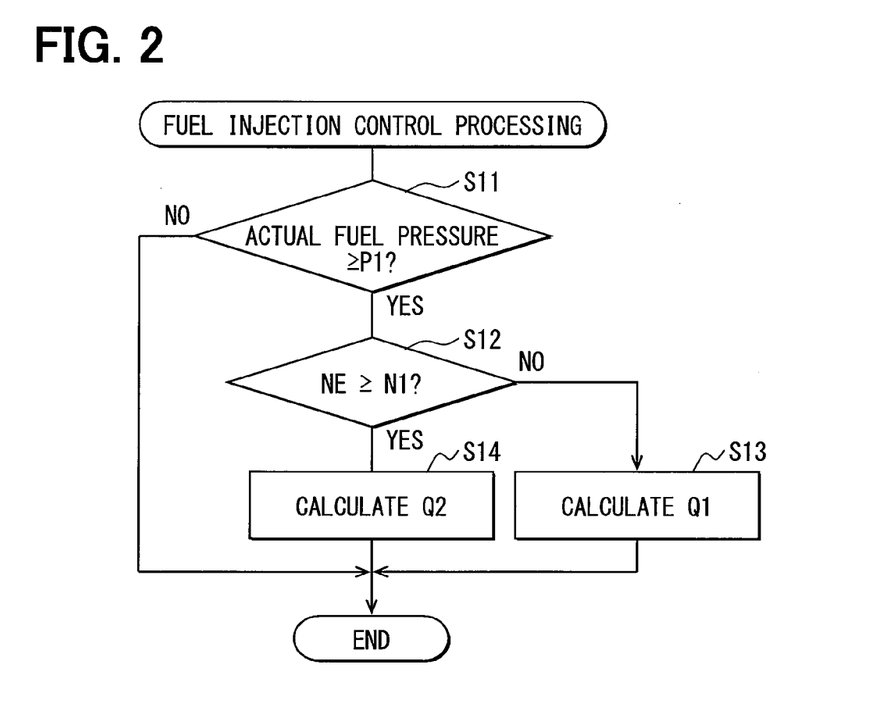
FIG. 2 is a flow chart illustrating a procedure for processing of fuel injection control according to the first embodiment.

Procedures for processing of fuel injection control and processing of fuel pressure control which are performed by the ECU 40 will be described in detail. First, the fuel injection control will be explained below. FIG. 2 is a flow chart illustrating the procedure for processing of the fuel injection control, and this processing is repeatedly performed by the ECU 40 with a predetermined period.

At S11 in FIG. 2, it is determined whether the actual fuel pressure detected by the fuel pressure sensor 29 is equal to or higher than the predetermined injection permitted fuel pressure P1. The injection permitted fuel pressure P1 is determined beforehand, and is 5 MPa, for example. The injection permitted fuel pressure P1 may be set as the minimum pressure in a control range of fuel pressure or as a pressure in its neighborhood. Then, in case of (actual fuel pressure)<P1, the present processing is ended; and in case of (actual fuel pressure)≥P1, control proceeds to S12. In case of (actual fuel pressure)<P1, the implementation of fuel injection by the injector 21 is not permitted. After engine start, once an affirmative determination is made at S11, due to the fuel pressure rise, an affirmative determination continues to be made at S11 thereafter (same applies to S21 in FIG. 3 to be hereinafter described).

At S12, it is determined whether the engine rotation speed NE is equal to or higher than the starting determination value N1. The starting determination value N1 may be such a determination value that occurrence of the first explosion (combustion of fuel) can be determined after engine start, and is N1=400 rpm in the present embodiment. After that, in case of NE<N1, control proceeds to S 13; and in case of NE≥N1, control proceeds to S14.

At S13, the starting injection amount Q1 is calculated based on the alcohol concentration of fuel and the engine water temperature. The starting injection amount Q1 is calculated such that the injection amount becomes larger as the alcohol concentration is higher or as the engine water temperature is lower. Based on the starting injection amount Q1, the fuel injection by the injector 21 is carried out.

At S 14, the after-start injection amount Q2 is calculated based on the engine operating condition and so forth. As described above, the basic injection amount is calculated based on the engine load and the engine rotation speed, and for example, a water temperature correction, air-fuel ratio correction, or alcohol concentration correction is appropriately made to the basic injection amount to calculate the final fuel injection amount (after-start injection amount Q2). Based on this fuel injection amount, the fuel injection by the injector 21 is carried out.

In addition, control (control of pressure-rising start) whereby to permit the fuel injection of the injector 21 on condition that the actual fuel pressure has reached the injection permitted fuel pressure P1 may be carried out only if the engine 10 is in a predetermined low-temperature state. For example, the control of the pressure-rising start is performed only if the engine water temperature is 60° C. or less. In this case, if the engine 10 is not in the predetermined low-temperature state (if engine water temperature >60° C.), the fuel injection may be permitted at the time that the fuel pressure has reached a predetermined low-pressure value (e.g., 0.4 MPa) that is lower than the injection permitted fuel pressure P1.

Figure 3:
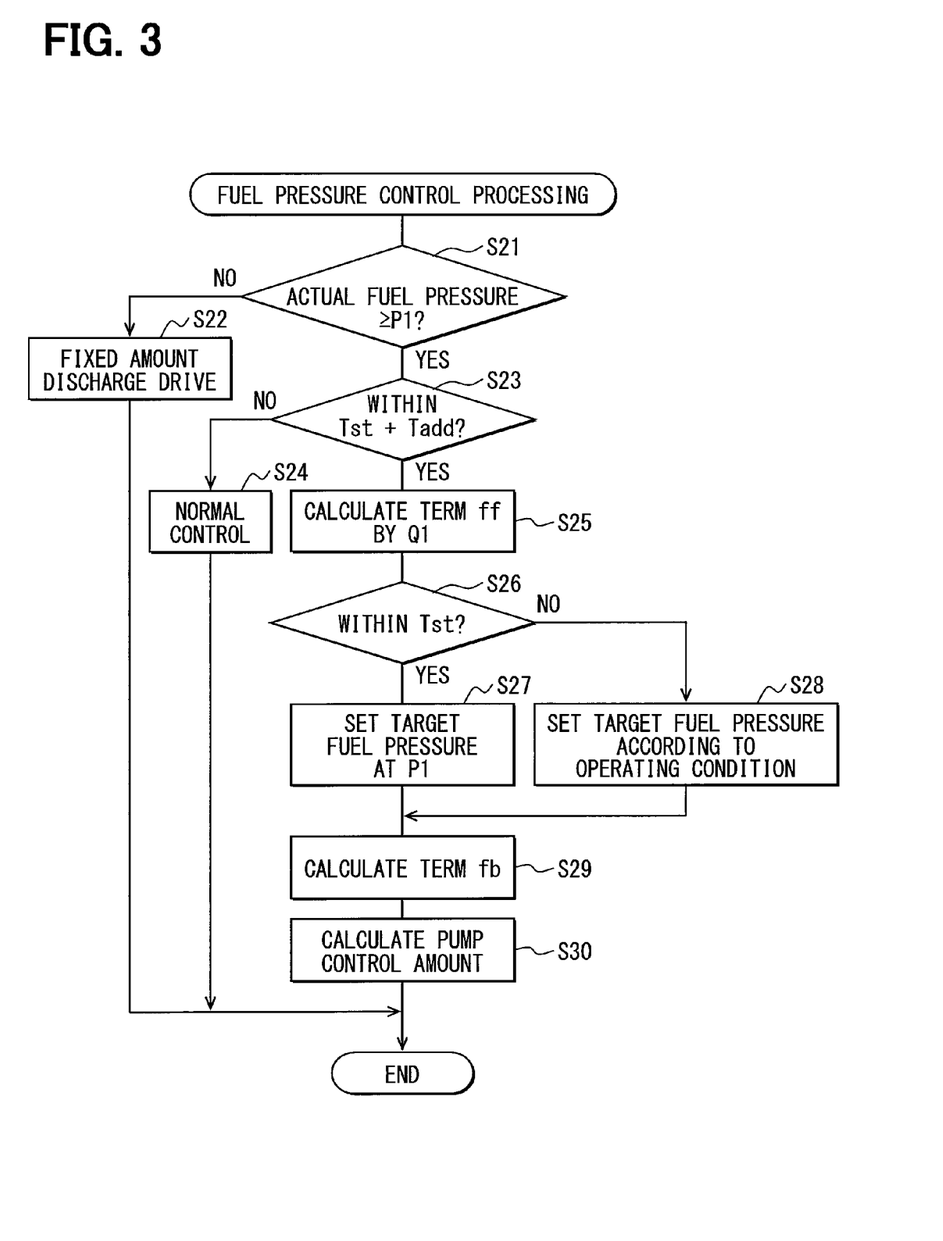
FIG. 3 is a flow chart illustrating a procedure for processing of fuel pressure control according to the first embodiment.

FIG. 3 is a flow chart illustrating the procedure for processing of fuel pressure control, and this processing is repeatedly performed by the ECU 40 with a predetermined period.

At S21 in FIG. 3, it is determined whether the actual fuel pressure has increased to the injection permitted fuel pressure P1. In case of (actual fuel pressure)<P1, control proceeds to S22 to perform a fixed amount discharge from the high-pressure pump 26. In the present embodiment, the high-pressure pump 26 is driven with the discharge amount of the high-pressure pump 26 set at the maximum discharge amount. The fixed amount discharge can be carried out at a predetermined amount that is not the maximum discharge amount.

Figure 4:
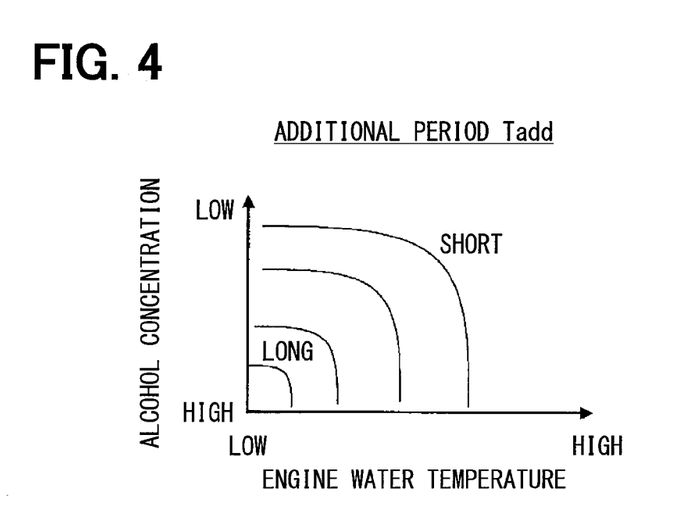
FIG. 4 is a diagram illustrating a relationship for setting an additional period according to the first embodiment.

In case of (actual fuel pressure)≥P1, control proceeds to S23 to determine which to perform for the fuel pressure feedback control between normal control and starting feedback control. Specifically, at S23, it is determined whether this moment is within a predetermined period after the commencement of the starting of the engine 10. This predetermined period is a period (Tst+Tadd) which is a sum of a starting period Tst before a predetermined rotation increase (rotation increase at the starting determination value N1 or larger) due to the combustion of fuel after the commencement of starting of the engine 10 by the starter 39, and an additional period Tadd that follows the end of the starting period Tst. The additional period Tadd is set variably based on the alcohol concentration of fuel and the engine water temperature. In this case, for example, using a relationship illustrated in FIG. 4, the additional period Tadd may be set at longer period as the alcohol concentration is higher or as the engine water temperature is lower. Additionally, the additional period Tadd may be set based on either one of the alcohol concentration of fuel and the engine water temperature.

After that, in case of NO at S23, control proceeds to S24; and in case of YES at S23, control proceeds to S25. At S24, the normal control is performed as the fuel pressure feedback control. In this normal control, the feedforward term is calculated based on the after-start injection amount Q2. Furthermore, the after-start target fuel pressure P2 is calculated based on the engine operating conditions such as the engine rotation speed and the engine load, and the feedback term is calculated based on this after-start target fuel pressure P2 and the actual fuel pressure. Then, the pump control amount is calculated from these feedforward term and feedback term to control the drive of the high-pressure pump 26 using the pump control amount.

At S25, the feedforward term is calculated based on the starting injection amount Q1. The additional period Tadd subsequent to the starting period Tst corresponds to the time after completion of starting of the engine 10 in terms of an engine rotation state, and the after-start injection amount Q2 is calculated for the fuel injection amount. However, in the additional period Tadd, the feedforward term is calculated using the starting injection amount Q1 which has been calculated in the starting period Tst before the period Tadd.

After that, it is determined at S26 whether this moment is within the starting period Tst. If this moment is within the starting period Tst, control proceeds to S27 to set the target fuel pressure at the injection permitted fuel pressure P1.

If this moment is not within the starting period Tst (i.e., if this moment is within the additional period Tadd), control proceeds to S28 to calculate the after-start target fuel pressure P2 (similar to the normal control) based on the engine operating conditions such as the engine rotation speed and the engine load.

Then, at S29, the feedback term is calculated based on the target fuel pressure (injection permitted fuel pressure P1 or after-start target fuel pressure P2) that is calculated at S27 or S28, and the actual fuel pressure. At step 30 that follows, the pump control amount is calculated from the feedforward term calculated at S25 and the feedback term calculated at S29. The drive of the high-pressure pump 26 is controlled by this pump control amount.

Figure 5:
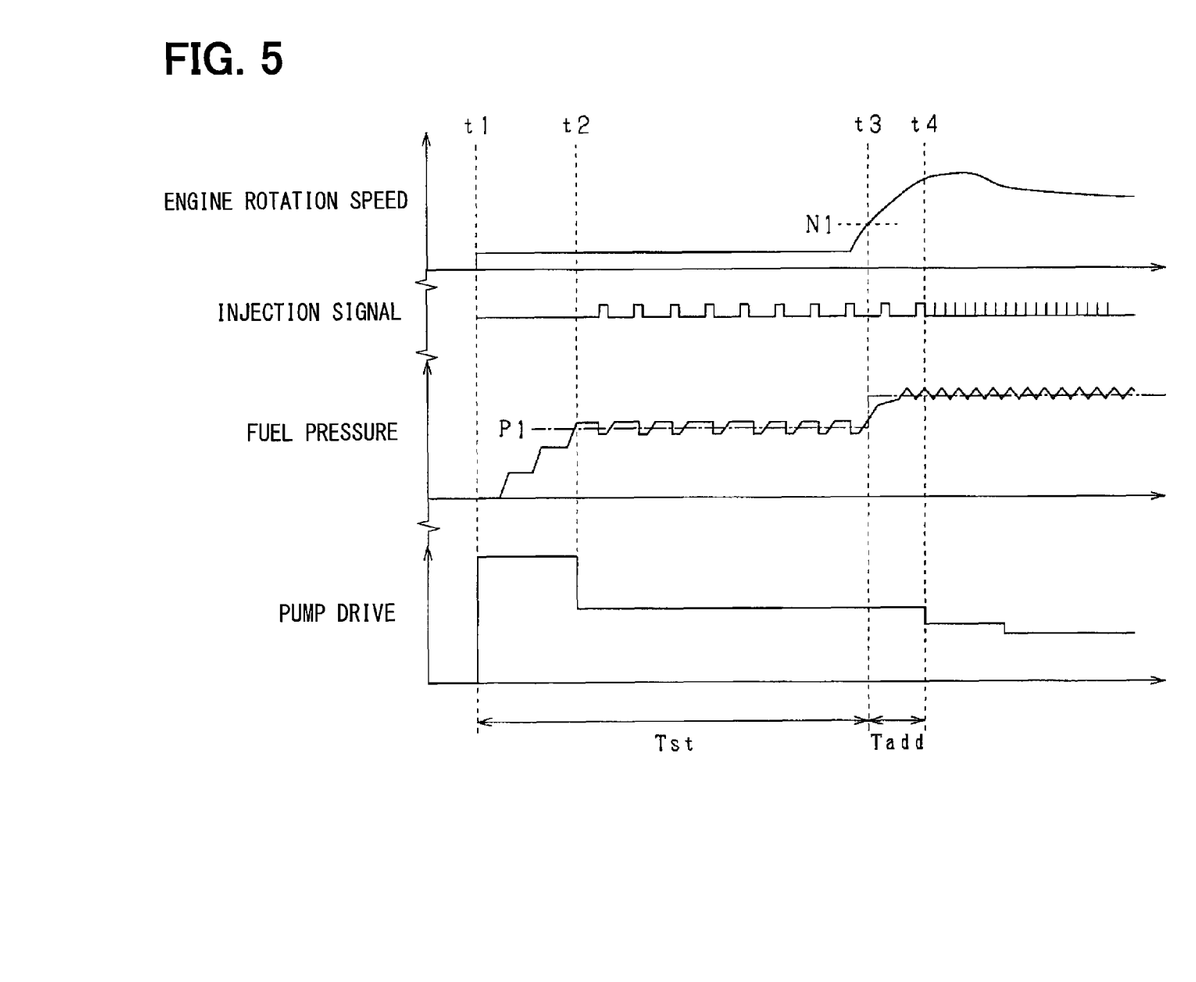
FIG. 5 is a timing diagram more specifically illustrating the fuel pressure control at time of engine start according to the first embodiment.

FIG. 5 is a timing diagram more specifically illustrating the fuel pressure control at the time of engine start. FIG. 5 illustrates that the fuel pressure is in a low-pressure state (reduced to near atmospheric pressure) before engine start and that the pressure rises as a result of the commencement of starting of the engine 10.

Cranking by the starter 39 is started at timing t1, and the drive of the high-pressure pump 26 is accordingly started. The high-pressure pump 26 is driven at the maximum discharge amount because of a relation of (actual fuel pressure)<(injection permitted fuel pressure P1). When the fuel pressure increases gradually to satisfy a relation of (actual fuel pressure)≥(injection permitted fuel pressure P1) at timing t2, the fuel injection by the injector 21 is started and the fuel pressure feedback control is started after the timing t2.

At the timing t2, the fuel injection is carried out with the starting injection amount Q1. The injection permitted fuel pressure P1 is set at the target fuel pressure, and the fuel pressure feedback control is carried out based on this target fuel pressure. The fuel discharged amount from the high-pressure pump 26 is controlled using the feedforward term calculated by the starting injection amount Q1 and the feedback term calculated with the injection permitted fuel pressure P1 set at the target fuel pressure. After the timing t2, although the fuel pressure drops each time fuel is injected, the fuel pressure is brought back to the target fuel pressure immediately thereafter. During the timing t2 to t3, several fuel injections are performed before the completion of starting.

Then, at the timing t3, as a result of an increase of the engine rotation speed due to the occurrence of the first explosion of the engine 10, the engine rotation speed increases to the starting determination value N1 and it is determined that the engine start has been completed. Accordingly, the fuel injection amount is changed into the after-start injection amount Q2. Moreover, the target fuel pressure is changed from the injection permitted fuel pressure P1 to the after-start target fuel pressure P2, and the fuel pressure feedback control is carried out based on this after-start target fuel pressure P2. The period until this timing t3 corresponds to the starting period Tst.

A period from the timing t3 to t4 is the additional period Tadd, and in this additional period Tadd, the fuel injection itself is carried out by the after-start injection amount Q2. However, calculation of the feedforward term based on the starting injection amount Q1 is continued. During the timing t3 to t4, the engine rotation speed increases to the starting determination value N1 and then rises further due to engine pick-up. In doing so, the feedforward term is calculated by the starting injection amount Q1. Thus, there is limited such an inconvenience that an unintended fuel pressure drop is caused and that rotation behavior becomes unstable due to this fuel pressure drop. After the timing t4, the normal control is performed for the fuel pressure feedback control.

In the present embodiment explained in full detail, the following excellent effects are produced.

As the fuel injection control at the time of engine start, the starting injection amount Q1 is set based on the alcohol concentration of fuel and the engine water temperature, and the fuel injection is carried out by this starting injection amount Q1. Consequently, influenced not only by the water temperature of the engine 10 at the time of its starting but also by the alcohol concentration, the starting injection amount Q1 is set. As a result, in the case of use of alcohol-containing fuel, the fuel injection control suitable for the alcohol concentration each time can be carried out.

After the commencement of the starting of the engine 10, the fuel pressure feedback control is started before completion of starting (before NE≥N1 is satisfied). On this occasion, the feedforward term is calculated based on the starting injection amount Q1. Accordingly, proper fuel pressure feedback control can be performed early after the commencement of the starting of the engine 10. In this case, despite implementation of more than one fuel injection after the commencement of starting until completion of starting of the engine 10, there can be performed a matching between a decrease of fuel pressure due to the fuel injection and an increase of fuel pressure due to the fuel discharge from the high-pressure pump 26, so as to limit a fuel pressure change. While the injection amount of alcohol-containing fuel tends to be larger than gasoline fuel so that the fuel pressure change is easily caused immediately after the engine 10 is started, this fuel pressure change can be limited. As a result, when starting the engine 10 using alcohol-containing fuel, the fuel pressure can be stabilized and eventually the engine 10 can be properly started.

At the time of engine start, when the completion of starting is determined (when the starting period Tst is ended), the after-start injection amount Q2 is calculated instead of the starting injection amount Q1. After this completion of starting as well, the feedforward term is calculated using the starting injection amount Q1 in the additional period Tadd. As a consequence, there can be limited such an inconvenience that the rotation behavior becomes unstable due to the fuel pressure reduction when the engine rotation speed further rises (i.e., immediately after completion of starting) after the completion of starting of the engine 10 has been determined.

The additional period Tadd is set at a longer period as the alcohol concentration of fuel is higher or as the engine water temperature is lower. Accordingly, when unstable behavior of the engine rotation speed is readily caused immediately after engine start, the engine rotation speed can be stabilized.

At the time of engine start, the fuel pressure is increased beforehand to the injection permitted fuel pressure P1 before the start of fuel injection, and the fuel injection is started in this highly-pressurized state. After the fuel pressure has increased to the injection permitted fuel pressure P1, the fuel pressure feedback control is performed with this injection permitted fuel pressure P1 as a target value. In this case, by use of alcohol-containing fuel, fuel can be evaporated properly from the very beginning of injection start even in a state where fuel is not easily evaporated. In addition, the fuel pressure feedback control is started with the injection permitted fuel pressure P1 as a target value. As a result, the control can be moved from the fixed amount control into the fuel pressure feedback control without causing a fuel pressure change.

Second Embodiment

A second embodiment will be described with a focus on its difference from the above first embodiment. In the present embodiment, after commencement of starting of an engine 10, it is determined whether a starting period Tst is prolonged longer than a predetermined determination period Tlim. If it is determined that the starting period Tst is prolonged longer than the determination period Tlim, a target fuel pressure is increased.

Figure 6:
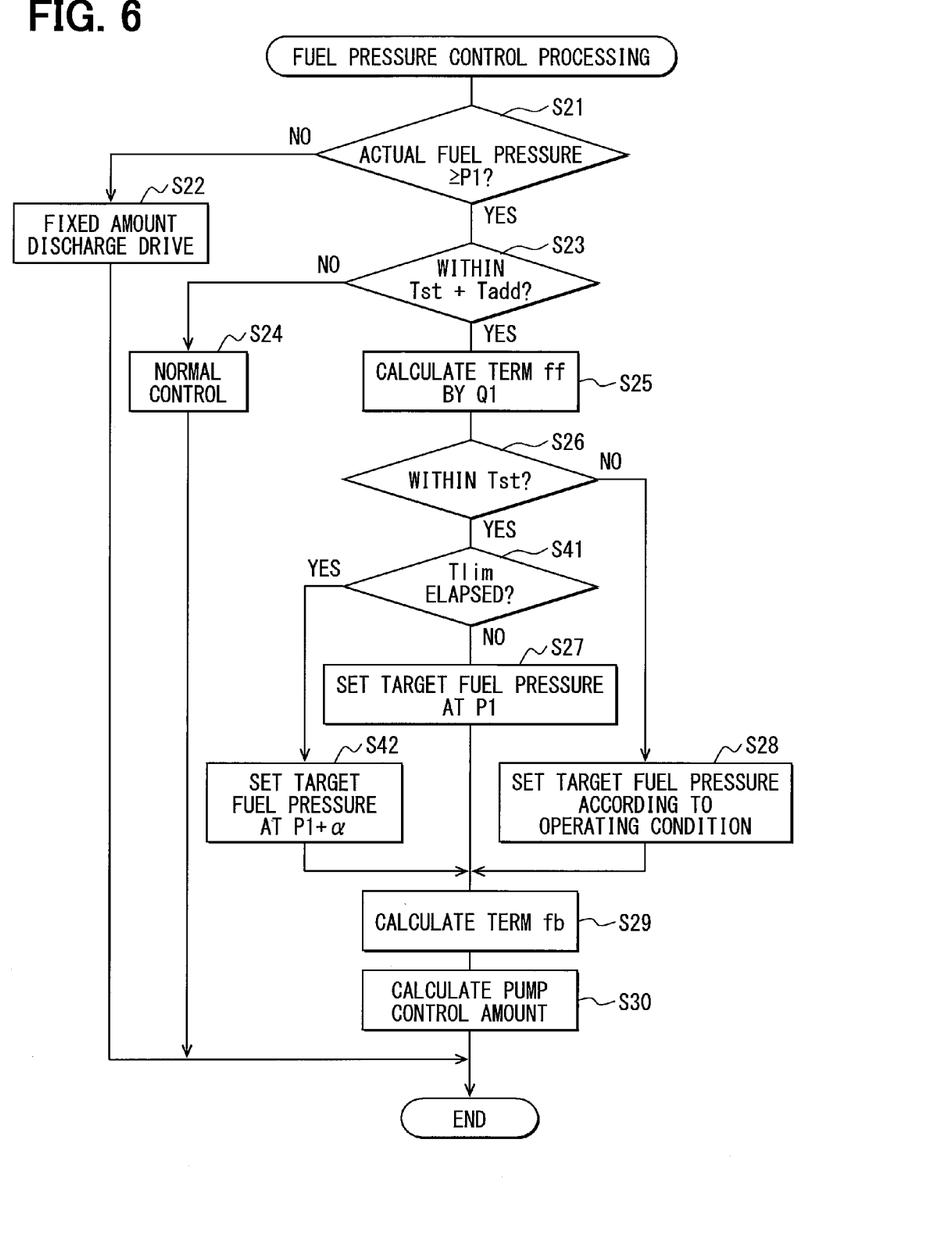
FIG. 6 is a flow chart illustrating a procedure for processing of fuel pressure control in accordance with a second embodiment.

FIG. 6 is a flow chart illustrating a procedure for processing of fuel pressure control in the second embodiment, and this processing is performed by an ECU 40 in place of the above-described processing in FIG. 3. In FIG. 6, the same step number is used for a common processing shared with FIG. 3, and explanation of the common processing is simplified in the following description.

Figure 7:
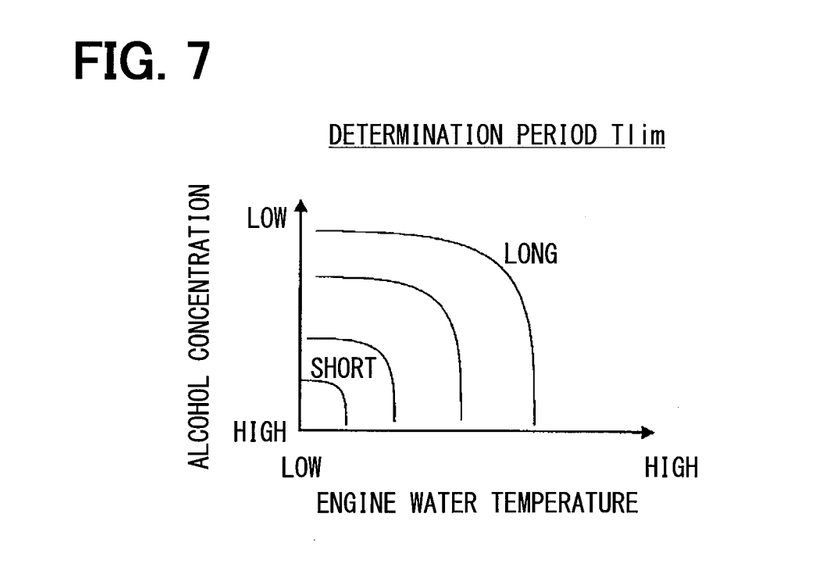
FIG. 7 is a diagram illustrating a relationship for setting a determination period according to the second embodiment.

In FIG. 6, if this moment is within the starting period Tst (in the case of YES at S26), it is determined at S41 whether the determination period Tlim has elapsed from the commencement of starting of the engine 10. The determination period Tlim is set variably based on alcohol concentration of fuel and engine water temperature. In this case, using a relationship illustrated in FIG. 7, for example, the determination period Tlim may be set at a shorter period as the alcohol concentration is higher or as the engine water temperature is lower. Additionally, the determination period Tlim may be set based on either one of the alcohol concentration of fuel and the engine water temperature.

In case of NO at S41, control proceeds to S27; and in case of YES at S41, control proceeds to S42. At S27, as described in FIG. 3, the target fuel pressure is set at an injection permitted fuel pressure P1. At S42, the target fuel pressure is set at the injection permitted fuel pressure P1+α. "α" is an increased amount of the target fuel pressure, and is approximately several MPa (e.g., 2 MPa).

Figure 8:
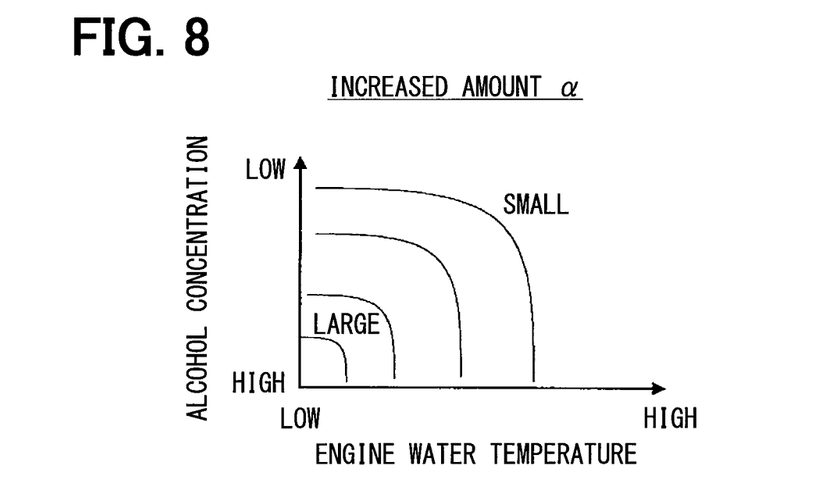
FIG. 8 is a diagram illustrating a relationship for setting an increased amount of a target fuel pressure according to the second embodiment.

Nevertheless, the increased amount α of the target fuel pressure can be set variably based on the alcohol concentration of fuel and the engine water temperature. In this case, using a relationship illustrated in FIG. 8, for example, the increased amount α may be made larger as the alcohol concentration is higher or as the engine water temperature is lower. Additionally, the increased amount α may be set based on either one of the alcohol concentration of fuel and the engine water temperature.

Figure 9:
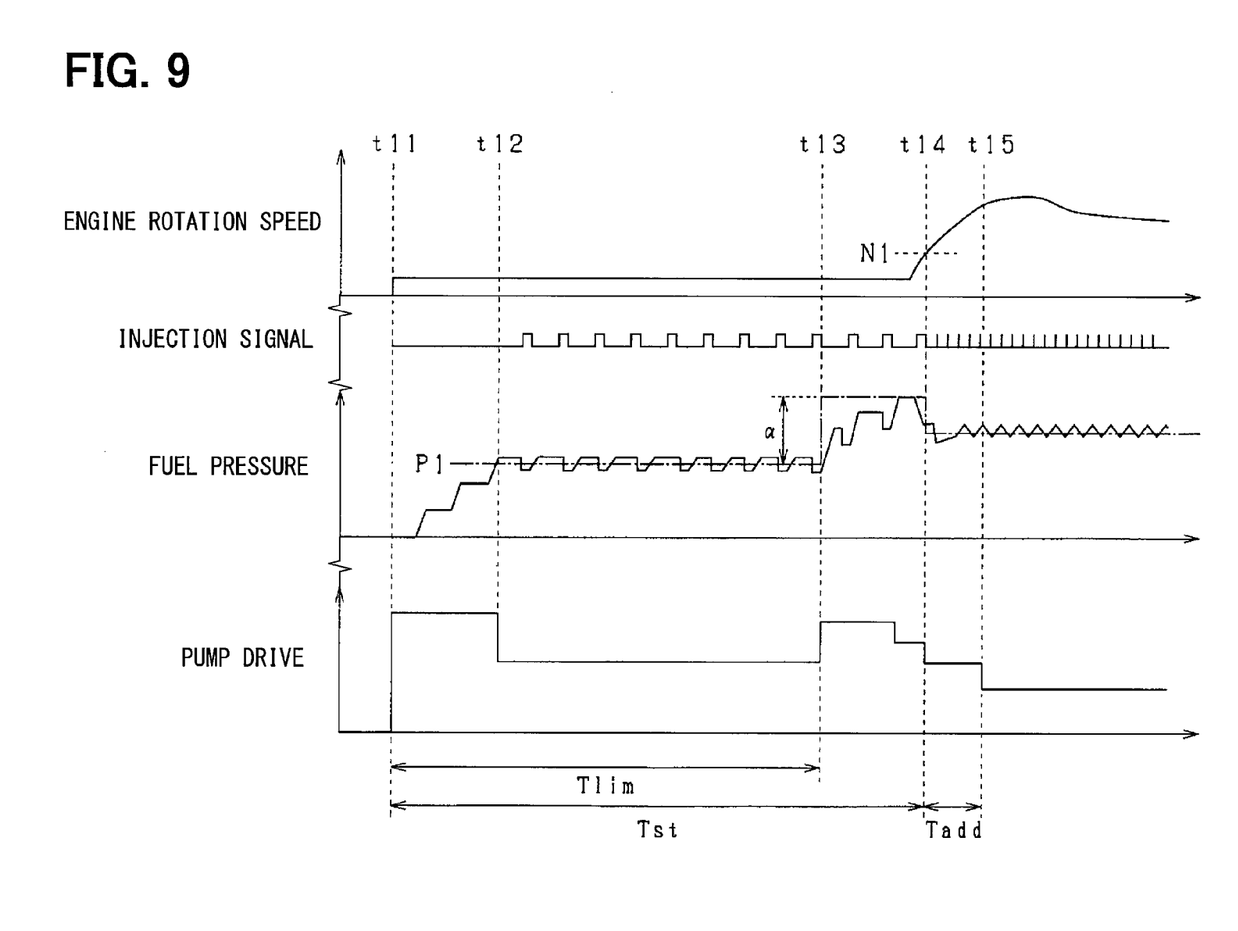
FIG. 9 is a timing diagram more specifically illustrating fuel pressure control at time of engine start according to the second embodiment.

FIG. 9 is a timing diagram more specifically illustrating the fuel pressure control at the time of engine start. In FIG. 9, similar to FIG. 5 described above, fuel pressure is in a low-pressure state before engine starting, and it is illustrated that the pressure rises as a result of the commencement of starting of the engine 10.

In FIG. 9, timings t11, t12 are similar to the timings t1, t2 in FIG. 5. The timing t11 is starting commencement timing, and the timing t12 is commencement timing of fuel pressure feedback control. In FIG. 9, a time that elapses before the completion of starting of the engine 10 is prolonged, and at timing t13, an elapsed time from the commencement of starting becomes longer than the determination period Tlim. For this reason, at the timing t13, the target fuel pressure is changed to the injection permitted fuel pressure P1+a, and the pump drive amount is accordingly increased. In addition, during timing t13 to t14, actual fuel pressure approaches the target fuel pressure after the change of the target fuel pressure, so that the pump drive amount is reduced.

Then, at the timing t14, it is determined that the engine starting has been completed, and change of the fuel injection amount (Q1→Q2) and change of the target fuel pressure (P1+α→P2) are made. In an additional period Tadd during timing t14 to t15, calculation of a feedforward term based on an starting injection amount Q1 is continued (similar to the timing t3 to t4 in FIG. 5). After timing t15, normal control is carried out for the fuel pressure feedback control.

In the second embodiment explained in full detail, after commencement of the starting of the engine 10, if it is determined that the starting period Tst is prolonged longer than the determination period Tlim, the target fuel pressure is increased within the starting period Tst. Therefore, at the time of use of alcohol-containing fuel, it may take some time to complete the starting of the engine 10. In this embodiment, it is considered impossible for the engine 10 to be started up if the present target fuel pressure continues to be used in accordance with this duration time, and the target fuel pressure is thereby changed. Accordingly, robustness of the engine starting can be ensured.

Furthermore, the determination period Tlim is set at a shorter period as the alcohol concentration of fuel is higher or as the engine water temperature is lower. As a result, during a period after the commencement of starting of the engine 10 as well as until the completion of starting, stabilization of the fuel pressure can be achieved to improve startability of the engine 10.

The increased amount α of the target fuel pressure is set at a larger value as the alcohol concentration of fuel is higher or as the engine water temperature is lower. Consequently, the startability of the engine 10 can also be improved.

The above embodiments may be modified, for example, as follows.

In the above embodiments, the injection permitted fuel pressure P1 is a preset fixed value. Alternatively, the injection permitted fuel pressure P1 may be set variably by at least either one of the alcohol concentration and the engine water temperature. Specifically, the injection permitted fuel pressure P1 is set at a higher value as the alcohol concentration is higher. The injection permitted fuel pressure P1 is set at a higher value as the engine water temperature is lower.

In the above embodiments, the period after the commencement of starting of the engine 10 by the starter 39 until a predetermined rotation increase is produced is the "starting period Tst". Alternatively, a period after permission of the fuel injection, until a predetermined rotation increase is produced may be the "starting period Tst" (period from t2 to t3 in FIG. 5; period from t12 to t14 in FIG. 9). The same applies to the determination period Tlim, and the "determination period Tlim" may be set as an elapsed time after the permission of the fuel injection (period from t12 to t13 in FIG. 9).

In the above embodiments, the additional period Tadd is set based on at least either one of the alcohol concentration of fuel and the engine water temperature. Alternatively, the period (starting period Tst+additional period Tadd) may be set based on at least either one of the alcohol concentration of fuel and the engine water temperature.

In the above second embodiment, instead of setting of the determination period Tlim as an elapsed time (measured time), the determination period Tlim may be set as the number of fuel injections or as an accumulated time of the fuel injection.

In the above second embodiment, more than one determination period Tlim during which to determine a length of the starting period Tst are set, and the target fuel pressure may be increased by a predetermined pressure width whenever each determination period Tlim is reached. For example, within the starting period Tst, every time the elapsed time reaches each determination period Tlim, or every time the number of fuel injections reaches a predetermined number corresponding to each determination period Tlim, the target fuel pressure is increased by 1 MPa increments.

In the above embodiments, the additional period Tadd which follows the starting period Tst is set after the starting period Tst. Alternatively, this additional period Tadd does not need to be set. In this case, in FIG. 5, for example, the fuel pressure feedback control moves into the normal control at the timing t3 that engine starting is completed. In FIG. 9, the fuel pressure feedback control moves into the normal control at the timing t14 that engine starting is completed.

The alcohol concentration of fuel may be obtained through estimated calculation instead of detection by a sensor. For example, because if the alcohol concentration of fuel is different, an air-fuel ratio and engine torque are different despite the same fuel amount, the alcohol concentration is estimated based on the air-fuel ratio or engine torque. Similarly, the engine water temperature may be obtained through estimated calculation instead of detection by a sensor. For example, the engine water temperature (actually, water temperature at time of engine starting) is estimated based on the outside air temperature. Instead of the engine water temperature, cylinder wall temperature or temperature of engine lubricating oil may be employed for the engine temperature.

To sum up, the fuel injection control device in accordance with the above embodiments can be described as follows.

A fuel injection control device is applied to a fuel injection system for an internal combustion engine 10. The fuel injection system includes a pressure accumulation chamber 27, a fuel injection valve 21, a fuel pump 26, and a fuel pressure detecting means 29. The pressure accumulation chamber 27 is capable of accumulating pressure of fuel in a high-pressure state. The fuel injection valve 21 injects fuel, which is supplied by the pressure accumulation chamber 27, directly into a combustion chamber 23 of the engine 10. The fuel pump 26 highly pressurizes fuel, which is supplied from a low-pressure side of the system, and supplies the highly-pressurized fuel to the pressure accumulation chamber 27. The fuel pressure detecting means 29 is for detecting fuel pressure in the pressure accumulation chamber 27. Alcohol-containing fuel including alcohol is employable for fuel in the engine 10. The fuel injection control device includes a fuel injection control means 40 and a pump control means 40. The fuel injection control means 40 is for controlling a fuel injection amount of the fuel injection valve 21. The pump control means 40 is for calculating a pump control amount based on a feedforward term and a feedback term and is for controlling the fuel pump 26 based on the pump control amount. The feedforward term is calculated based on the fuel injection amount of the fuel injection valve 21. The feedback term is calculated based on a difference between a target fuel pressure and an actual fuel pressure, which is detected by the fuel pressure detecting means 29. The fuel injection control means 40 includes a first injection control means for performing the injection of fuel by the fuel injection valve 21 at a starting injection amount Q1 in a starting period Tst after commencement of starting of the engine 10 by its starting means 39 until a predetermined rotation increase of the engine 10 is produced in association with fuel combustion. The starting injection amount Q1 is set based on an alcohol concentration of fuel and a temperature of the engine 10. The pump control means 40 includes a starting control means for calculating the feedforward term based on the starting injection amount Q1 in the starting period Tst and for calculating the pump control amount by use of the feedforward term calculated by the starting control means.

As a result of the above-described configuration, for the fuel injection control at the time of starting of the internal combustion engine 10, the starting injection amount Q1 is set based on the alcohol concentration of fuel and the engine temperature. The fuel injection through the fuel injection valve 21 is carried out using this starting injection amount Q1. In this case, influenced not only by the engine temperature at the time of engine starting but also by the alcohol concentration, the starting injection amount Q1 is set. As a result, in the case of use of alcohol-containing fuel, the fuel injection control suitable for the alcohol concentration each time can be carried out.

After commencement of the starting of the internal combustion engine 10, the fuel pressure feedback control is started, before the rotation increase is produced due to the combustion of fuel. In so doing, the feedforward term is calculated based on the starting injection amount Q1. As a consequence, the proper fuel pressure feedback control can be performed early after commencement of the starting of the engine 10. In this case, despite implementation of more than one fuel injection after the commencement of starting until completion of starting of the engine 10, there can be performed a matching between a decrease of fuel pressure due to the fuel injection and an increase of fuel pressure due to the fuel discharge from the fuel pump 26, so as to limit a fuel pressure change. While the injection amount of alcohol-containing fuel tends to be larger than gasoline fuel so that the fuel pressure change is easily caused immediately after the engine 10 is started, this fuel pressure change can be limited. As a result, when starting the engine 10 using alcohol-containing fuel, the fuel pressure can be stabilized and eventually the engine 10 can be properly started.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A fuel injection control device applied to a fuel injection system for an internal combustion engine, wherein:
   the fuel injection system includes:
      a pressure accumulation chamber capable of accumulating pressure of fuel in a high-pressure state;
      a fuel injection valve injecting fuel, which is supplied by the pressure accumulation chamber, directly into a combustion chamber of the engine;
      a fuel pump highly-pressurizing fuel, which is supplied from a low-pressure side of the system, and supplying the highly-pressurized fuel to the pressure accumulation chamber; and
      a fuel pressure detecting means for detecting fuel pressure in the pressure accumulation chamber; and
   alcohol-containing fuel including alcohol is employable for fuel in the engine, the fuel injection control device comprising:
   a fuel injection control means for controlling a fuel injection amount of the fuel injection valve; and
   a pump control means for calculating a pump control amount based on a feedforward term and a feedback term and for controlling the fuel pump based on the pump control amount, wherein:
      the feedforward term is calculated based on the fuel injection amount of the fuel injection valve;
      the feedback term is calculated based on a difference between a target fuel pressure and an actual fuel pressure, which is detected by the fuel pressure detecting means;
      the fuel injection control means includes a first injection control means for performing the injection of fuel by the fuel injection valve at a starting injection amount in a starting period after commencement of starting of the engine by its starting means until a predetermined rotation increase of the engine is produced in association with fuel combustion;
      the starting injection amount is set based on an alcohol concentration of fuel and a temperature of the engine; and the pump control means includes a starting control means for calculating the feedforward term based on the starting injection amount in the starting period and for calculating the pump control amount by use of the feedforward term calculated by the starting control means.

2. The fuel injection control device according to claim 1, wherein:
the fuel injection control means further includes a second injection control means for performing the injection of fuel by the fuel injection valve at an after-start injection amount that is set based on a rotation speed of the engine and a load of the engine;
the fuel injection control means moves its control from control by the first injection control means into control by the second injection control means at an end of the starting period; and
the starting control means calculates the feedforward term based on the starting injection amount in an additional period which follows the starting period after the end of the starting period, and calculates the pump control amount by use of the feedforward term calculated by the starting control means.

3. The fuel injection control device according to claim 2, further comprising a means for setting the additional period based on at least either one of the alcohol concentration of fuel and the temperature of the engine.

4. The fuel injection control device according to claim 1, further comprising:

a determining means for determining whether the starting period is prolonged longer than a predetermined determination period after the commencement of starting of the engine by the starting means; and
a target fuel pressure changing means for increasing the target fuel pressure within the starting period when it is determined by the determining means that the starting period is prolonged longer than the determination period.

5. The fuel injection control device according to claim 4, further comprising a means for calculating the determination period based on at least either one of the alcohol concentration of fuel and the temperature of the engine.

6. The fuel injection control device according to claim 4, wherein the target fuel pressure changing means includes a means for calculating an increase amount of the target fuel pressure based on at least either one of the alcohol concentration of fuel and the temperature of the engine.

7. The fuel injection control device according to claim 1, further comprising an injection start permitting means for permitting the injection of fuel by the fuel injection valve when the fuel pressure in the pressure accumulation chamber reaches a predetermined injection permitted fuel pressure after the commencement of starting of the engine by the starting means, wherein the starting control means calculates the feedback term with the injection permitted fuel pressure set at the target fuel pressure.

* * * * *